US012244918B2

(12) United States Patent
Vaezi Joze et al.

(10) Patent No.: US 12,244,918 B2
(45) Date of Patent: Mar. 4, 2025

(54) ADAPTIVE MULTI-SCALE FACE AND BODY DETECTOR

(71) Applicant: Microsoft Technology Licensing, LLC, Redmond, WA (US)

(72) Inventors: Hamidreza Vaezi Joze, Redmond, WA (US); Zehua Wei, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/199,826

(22) Filed: May 19, 2023

(65) Prior Publication Data
US 2023/0291993 A1    Sep. 14, 2023

Related U.S. Application Data

(63) Continuation of application No. 17/512,780, filed on Oct. 28, 2021, now Pat. No. 11,700,445.

(51) Int. Cl.
*H04N 23/611* (2023.01)
*G06F 18/21* (2023.01)
*G06V 10/32* (2022.01)
*H04N 23/69* (2023.01)
*H04N 23/695* (2023.01)

(52) U.S. Cl.
CPC ....... *H04N 23/611* (2023.01); *G06F 18/2163* (2023.01); *G06V 10/32* (2022.01); *H04N 23/69* (2023.01); *H04N 23/695* (2023.01)

(58) Field of Classification Search
CPC .......... H04N 5/23219; H04N 5/23296; H04N 5/23299; G06K 9/6261; G06V 10/32
See application file for complete search history.

(56) References Cited

U.S. PATENT DOCUMENTS

| | | | |
|---|---|---|---|
| 8,478,347 B2 * | 7/2013 | Kim | H04N 23/69 455/90.3 |
| 11,482,045 B1 * | 10/2022 | Kim | G06V 20/52 |
| 2019/0130165 A1 * | 5/2019 | Seshadri | G06F 18/24133 |
| 2021/0319254 A1 * | 10/2021 | Yu | G06V 10/82 |
| 2022/0076018 A1 * | 3/2022 | Geiss | H04N 23/61 |

* cited by examiner

*Primary Examiner* — Yogesh K Aggarwal

(57) ABSTRACT

Systems and methods are provided for determining faces and bodies of people in an image by adaptively scaling images and by iteratively using a deep neural network for inferencing. A camera captures an image including faces and bodies of people. A face/body determiner determines faces and bodies of people appearing in the image by resizing the image into a predetermined pixel dimension as input to the deep neural network. A region cropper determines a crop region associated with a low level of confidence in detecting faces and bodies that are too small to determine with an acceptable level of confidence. The region cropper resizes the crop region into the predetermined pixel dimension as input to the deep neural network. The face and body determiner determines other faces and bodies appearing in the resized crop region. An aggregator aggregates locations of the determined faces and bodies in the image.

20 Claims, 10 Drawing Sheets

ADAPTIVE MULTI-SCALE FACE AND BODY DETECTOR

CROSS-REFERENCE TO RELATED APPLICATIONS

This application is a continuation of U.S. patent application Ser. No. 17/512,780, filed on Oct. 28, 2021, the entire disclosure of which is hereby incorporated by reference in its entirety.

BACKGROUND

As video meetings have become commonplace, the importance of correctly conveying videos or images to other participants has increased. In addition, as video conferencing systems become more advanced, the systems are tasked with additional functions, such as zooming in on individuals in the conference itself and/or focusing on current speakers. In some video conference environments, wide-angle cameras are useful in capturing an entire meeting room with people sitting near and far from the camera. However, when using such cameras, an issue may arise as faces or bodies of people sitting farther away may appear quite small such that the system may not recognize the existence of a face and/or a body at all. In essence, a level of accuracy of detecting faces or bodies in an image declines when the faces or bodies get smaller. One solution may be to process images with a higher resolution for detecting smaller faces or bodies but such a solution would be computationally intensive and increase the overall cost of image processing, resulting the overall processing less efficient. Further, computational power may be limited in a camera device. Accordingly, there arises a tension between accuracy and efficiency in detecting faces or body of participants who appear in an image captured by a wide-angle camera. Thus, developing a technology, which better meets both accuracy and efficiency needs, is desirable.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to determining faces and/or bodies of people in an image. In particular, the present disclosure determines regions including faces and/or bodies in an image by adaptively scaling one or more regions where faces/bodies may appear in the image and iteratively detecting and determining faces/bodies in the scaled regions in the image accurately and efficiently. A face/body determiner uses an artificial intelligence (e.g., a deep neural network) for automatically detecting the faces or bodies in the image with degrees of confidence in detecting the faces or bodies in the image.

Some examples include a computer-implemented method for determining faces and bodies in an image. The computer-implemented method may include obtaining an image, resizing the image to a first predetermined size, wherein the first predetermined size is associated with a size of input to a first machine learning model for detecting an object; determining a first object in the image using the first machine learning model; determining, based on a level of confidence associated with detecting a second object in the image using the first machine learning model, a region within the image, the region includes the second object; resizing the region to a second predetermined size, wherein the second predetermined size is associated with a size of input to a second machine learning model for detecting the object; determining, based on the level of confidence associated with detecting the second object in the region using the second machine learning model, the second object in the region, wherein the first object and the second object are distinct; aggregating respective locations and sizes of the first object and the second object in the image; determining the second object in the aggregated image as an object of interest; and updating, based on the second object, at least one of a position or a zoom setting of a camera. The object includes either a face or a body of a person. The first and machine language model and the second machine learning model are identical, and wherein the first predetermined size and the second predetermined size are identical. The first and machine language models include a deep neural network. A location of the region is one of predetermined set of grid regions in the image.

Some examples include a system for determining objects in an image. The system may comprise a processor; and a memory storing computer-executable instructions that when executed by the processor cause the system to: resizing the image to a first predetermined size, wherein the first predetermined size is associated with a size of input to a first machine learning model for detecting an object; determining a first object in the image using the first machine learning model; determining, based on a level of confidence associated with detecting a second object in the image using the first machine learning model, a region within the image, the region includes the second object; resizing the region to a second predetermined size, wherein the second predetermined size is associated with a size of input to a second machine learning model for detecting the object; determining, based on the level of confidence associated with detecting the second object in the region using the second machine learning model, the second object in the region, wherein the first object and the second object are distinct; aggregating respective locations and sizes of the first object and the second object in the image; updating, based on the aggregated respective locations and sizes of the first object and the second object, a setting of a camera, wherein the setting includes at least one of a position or a zoom level of the camera; and capturing, based on the updated setting of the camera, another image. The object includes either a face or a body of a person. The first and machine language models include a deep neural network. A location of the region is one of predetermined set of grid regions in the image. The first machine learning model and the second machine learning model are identical, and wherein the first predetermined size and the second predetermined size are identical. A size of the image is greater than a size of the region, wherein the size of the region is greater than both of the first predetermined size and the second predetermined size, and wherein the size of the image represents a set of number of pixels in horizontal and vertical directions as a pixel dimension of the image. The aggregating includes non-maximum suppression.

Some examples include a computer-implemented method for updating a setting of a camera. The method may include capturing an image using a camera; resizing the image to a first predetermined size, wherein the first predetermined size is associated with a size of input to a first machine learning model for detecting a face of a person; determining a first face in the image using the first machine learning model;

determining, based on a level of confidence associated with detecting a second face in the image using the first machine learning model, a region within the image, the region includes the second face; resizing the region to a second predetermined size, wherein the second predetermined size is associated with a size of input to a second machine learning model for detecting the face; determining, based on the level of confidence associated with detecting the second face in the region using the second machine learning model, the second face in the region, wherein the first face and the second face are distinct; aggregating respective locations and sizes of the first face and the second face in the image; updating, based on the aggregated respective locations and sizes of the second face, a setting of the camera; and capturing, based on the updated setting of the camera, another image. The first and machine language models include a deep neural network. A location of the region is one of predetermined set of grid regions in the image. The first machine learning model and the second machine learning model are identical, and wherein the first predetermined size and the second predetermined size are identical. A size of the image is greater than a size of the region, wherein the size of the region is greater than both of the first predetermined size and the second predetermined size, and wherein the size of the image represents a set of number of pixels in horizontal and vertical directions as a pixel dimension of the image. The setting includes at least one of a position or a zoom level of the camera.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Objects may appear smaller in images captured by a wide-angle camera because the wide field of view (FOV) allows for capturing an increased amount of content over a more narrow FOV camera. For example, for a 180-degree FOV camera, widths of rectangular regions that respectively bound a face and a body of a person who is eight meters away from the camera is less than 0.5 or 1 percent of a width of the image where the same may be larger in more narrow FOV camera. Indeed, detecting the face and the body of the person in such varying sizes in the image may require significant processing power and/or other resources.

As discussed in more detail below, the present disclosure relates to determining faces and bodies in an image. In particular, the disclosed technology obtains an image using a camera (e.g., a wide-angle camera) and iteratively determines faces and bodies appearing in the image with varying sizes. In aspects, the disclosed technology scales the captured image and detects faces and bodies using the scaled image of the captured image as an input to a deep neural network. A region cropper selects one or more regions in the captured image where a confidence level of detecting faces/bodies is below a predetermined threshold. The region cropper adaptively crops the regions (i.e., the crop regions) and scales the crop regions to generate scaled crop regions. An image reduction ration increases as the region cropper scales the crop regions from a pixel dimension of the captured image another pixel dimension as input to the neural network. A face/body determiner iteratively detects faces/bodies that are smaller in the captured image by using the scaled crop regions as input to the neural network. The increase in an image reduction ratio from the crop region in the image and the scaled crop regions improves an accuracy of detecting faces and bodies that appear smaller in the crop regions.

Figure 1:
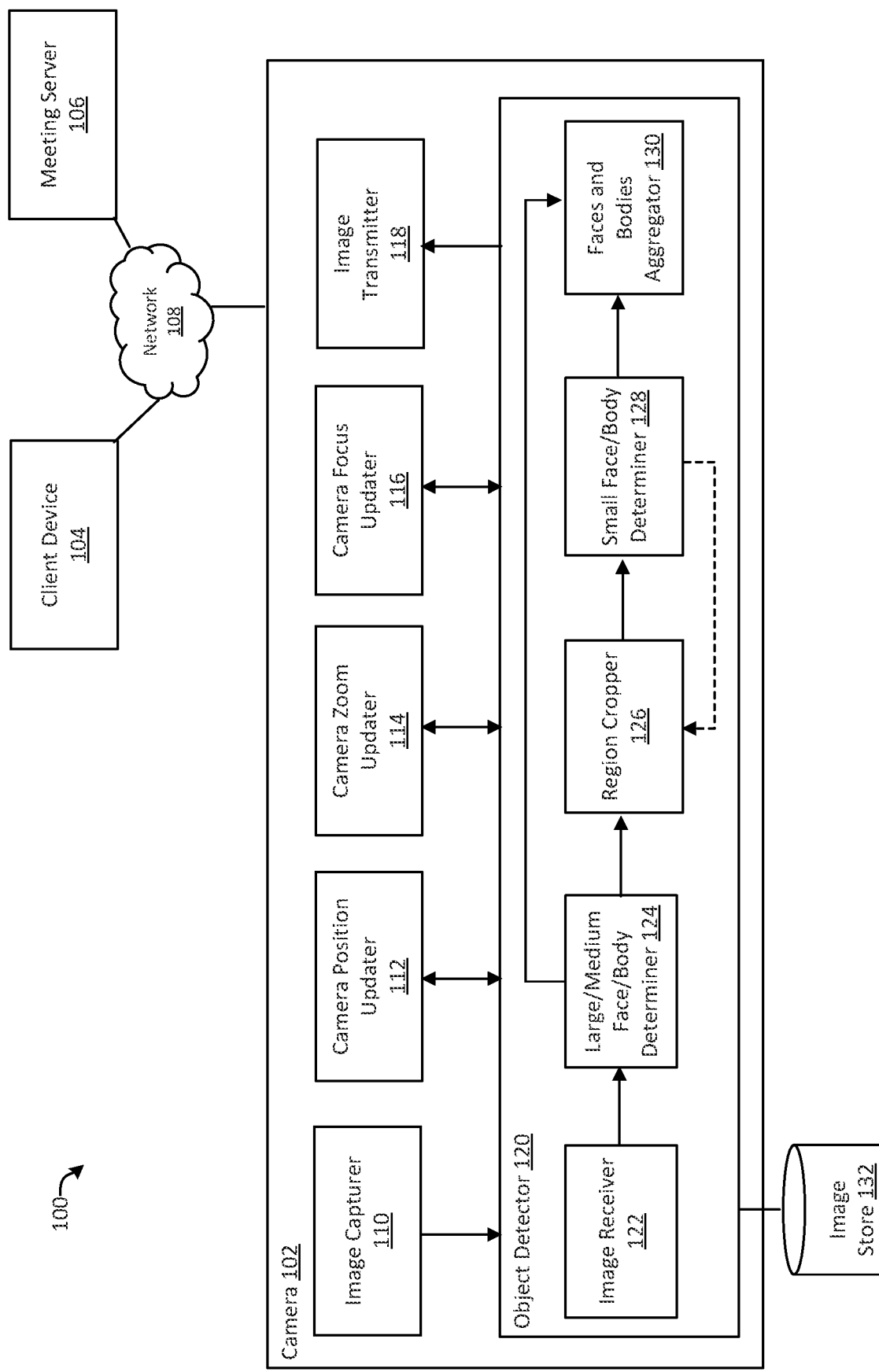
FIG. 1 illustrates an overview of an example system determining one or more regions including a face or body in an image in accordance with aspects of the present disclosure.

FIG. 1 illustrates an overview of an example system determining one or more regions including a face or body in an image in accordance with aspects of the present disclosure. The system 100 includes a camera 102, a client device 104, a meeting server 106, and a network 108. The camera captures images of people who participate in a video conference, a video chat, a teleconference, and the like. In aspects, the camera 102 may determine faces and bodies of people who appear in the image. Based on the determined faces and bodies in the image, the camera may zoom in/out, refocus, and/or follow a select participant of the call. In aspects, the camera 102 may include a wide angle camera, which captures an image of an entire meeting room. The camera 102 may transmit the captured videos and/or images to the client device 104 via the meeting server 106 over the network 108. Although embodiments discussed herein describe the use of a wide-angle camera, those skilled in the art will appreciate that other cameras and/or images captured from other cameras may benefit from the teachings herein.

The camera 102 may include an image capturer 110, a camera position updater 112, a camera zoom updater 114, a camera focus updater 116, an image transmitter 118, and an object detector 120. The image capturer 110 may capture and obtain image. For example, the image capturer 110 may capture an image of a meeting room with one or more people as participants of a meeting. In aspects, the image capturer 110 may capture a frame of a video as the image. The object detector 120 detects one or more objects in the image. In aspects, the one or more objects may be faces and bodies of people appearing in the image.

The camera 102 may automatically update its position (e.g., a direction of the camera 102), a zoom level, and a focus based on locations of faces and bodies appearing in the image. In aspects, the camera 102 may automatically follow and zoom into a person appearing in the image and following the person as the person moves by iteratively updating the camera settings based on determined positions of the person.

The image capturer 110 captures the image. In aspects, the image capturer 110 may include a wide angle camera that offers a wide FOV while faces and bodies of people in the image appear small. In some aspects, a captured image may include one or more people who appear large sized as they are close to the camera. The captured image may also include one or more people smaller, a far from the camera. The image capturer 110 may send the captured image to the object detector 120. The object detector 120 may store the captured image in the image store 132.

The camera position updater 112 updates a position of the camera. In aspects, the camera 102 updates its position and follows a select person as the person moves as the object detector 120 detects and determines a position of faces and bodies of people in the image. The position of the camera may be updated by changing one or more parameters associated with degrees of freedom. For example, under six degrees of freedom, the parameters may include at least in part: moving up and down (elevating/heaving), moving left and right (strafing/swaying), moving forwards and backward (walking/surging), swivels left and right (yawing), tilts forward and backward (pitching), and pivots side to side (rolling).

The camera zoom updater 114 updates a zoom level of the camera. In aspects, the camera 102 updates its zoom level and follow a select person based on output from the object detector 120 that detects and determines a position of faces and bodies of people in the image. For example, the camera zoom updater 114 may increase a zoom level to display a participant who sits on a far end of a table as the person talks during a meeting. Additionally or alternatively, the camera zoom updater 114 may decrease a zoom level as the participant of the meeting moves closer to the camera and maintains the face of the participant within the FOV.

The camera focus updater 116 updates a focus on a region of the image. In aspects, the camera 102 updates its focus and follows a select person as the person moves. Updating of the focusing on the person may be based on an output from the object detector 120 that detects and determines a position of faces and bodies of people in the image.

The image transmitter 118 transmits the image to the network 108. In aspects, the image transmitter 118 may transmit the image (and/or a stream of video including the image as a frame) to a meeting server 106 over the network 108. The meeting server 106 may retransmit the received image to the client device 104 over the network. In some other aspects, the image transmitter 118 may transmit the image to the client device 104 for displaying.

The object detector 120 detects one or more objects in an image, wherein, in some embodiments, the objects may be faces and/or bodies of people. The object detector 120 receives from the image capturer 110 an image that has been captured. The object detector 120 detects faces and bodies of people in the image by determining one or more regions in the image where the faces and bodies of people appear. In aspects, the object detector 120 uses an artificial intelligence (e.g., a machine learning model based on a deep neural network) to determine the one or more regions with faces and/or bodies of people.

For instance, the artificial intelligence may include a machine learning model with a deep neural network. The larger the faces and bodies, the machine learning model detects the faces and bodies in the image with more accuracy. An issue arises when a wide angle camera captures the image of a scene, where the faces and bodies appear smaller than when a regular angle camera captures the same scene. Unlike some traditional systems that use a large-sized images at a high resolution for detecting the faces and bodies, the present disclosure relates to detecting small faces and bodies by selecting regions where the faces and bodies may appear but with low confidence and adaptively scaling the regions in the image. The present disclosure then detects the faces and bodies in the scaled regions. The adaptive multi-scaling of image data maintains the pixel dimensions (e.g., 352×352 pixels) of input data to the deep neural network. Accordingly, the disclosed technology may maintain the level of computational costs less than in cases where detecting faces and bodies based on a higher resolution of the entire image. Without adaptive multi-scaling, a system needs to process pixels of the entire image at a high resolution to recognize faces and bodies. In aspects, the adaptive multi-scaling of image data starts from an image with a lower resolution. The disclosed technology enables the system to scale only regions where the system did not find the faces and bodies at images at lower resolutions. The system recognizes faces and bodies with a higher resolution only in these regions. Furthermore, there is no need to recapture the entire images using varying resolutions for adaptive multi-scaling. The disclosed technology captures the image at a high resolution once and uses the captured image to generate parts of the image in different resolutions.

In aspects, the present disclosure uses more than one inferencing of the standard machine learning model where the first inferencing determines zero or more crops that may contain faces and/or bodies of people at varying levels of confidence. The first inferencing accurately determines faces and bodies that are large/medium in sizes. The second inference accurately determines faces and bodies that are in smaller in sizes using crop regions of the image.

The region cropper selects and crops regions where a level of confidence of detecting faces and bodies is lower than a predetermined threshold. The region cropper scales down a pixel dimension of the crop region from a pixel dimension of the captured image to a predetermined pixel dimension as input to the deep learning model. The scaling effectively increases a resolution of the crop region for a second inferencing. The second inferencing infers faces and bodies from the scaled crop region, which has a higher resolution than the scaled captured image, thereby enabling to detect faces and bodies at a level of confidence that is higher than by the first inferencing. The disclosed technology then aggregates the determined faces and bodies of the image as an output. As such, the adaptive, multi-scale detection of faces and bodies of people detects not only faces and bodies of people who appear in large sizes but also those that appear in small sizes at a distance accurately and efficiently.

The object detector 120 includes an image receiver 122, a large/medium face/body determiner 124, a region cropper 126, a small face/body determiner 128, and a faces and bodies aggregator 130. The object detector 120 further includes an image store 132. The image receiver 122 receives an image from the image capturer 110. In aspects, the image may be a frame of a video stream. The object detector 120 may iteratively detect an object and update a position, a zoom level, and a focus of the camera 102, and transmit the image and information associated with detected faces and bodies over the network 108 as the image receiver 122 iteratively receives images over time. The image receiver 122 may store the received image in an image store 132. In aspects, the image store 132 stores images that have been captured by the image capturer 110 and received by the image receiver 122 at an original size. In aspects, the image store 132 may store cropped images.

The large/medium face/body determiner 124 detects and determines one or more regions in the images where the faces and bodies of people appear. In aspects, the large/medium face/body determiner 124 uses a machine learning model to determine the one or more regions. The face and body of people may appear as close-ups and/or at a distance in the image. In aspects, the people far from camera in a scene of a wide angle camera may be limited to one or more regions in the image because of the large image field of view used by the wide angle camera. On the other hand, large faces and bodies, which may be detected more easily and accurately than smaller ones, could appear anywhere in the image. The characteristics of regions with faces and bodies become more prevalent for indoor scenes including a scene in a conference room or indoor surveillance areas.

The disclosed technology may use more than one inferencing based on the machine learning model. In aspects, the object detector 120, at a first inference, detects large/medium-sized faces and objects in the image using a deep neural network, and determines one or more regions of the image that may have faces and bodies of people, and therefore crops the one or more regions. The object detector 120, during a second (and subsequent) inference, detects the faces and bodies of people in the cropped regions using the same or another instance of a deep neural network. The object detector 120 aggregates the detected faces and bodies to generate an output of the object detection. In aspects, the camera may "zoom in" on the cropped regions based on the detected faces and bodies.

The region cropper 126 crops one or more regions where small-sized faces and/or bodies of people appear (i.e., the regions where a level of confidence for detecting faces and bodies by the large/medium face/body determiner 124 was low). In aspects, the small-sized faces and/or bodies are too small for accurately detecting faces and/or bodies without detecting the faces and/or bodies by using the cropped images with a higher resolution. In aspects, the region cropper 126 determines regions for cropping by detecting one or more regions where an accuracy of detecting faces and bodies is lower than a predetermined threshold. There may or may not be faces and/or bodies of people in such regions. In some other aspects, the region cropper 126 crops the one or more regions that are predetermined. For example, the predetermined region may be at the center of the image with a predetermined dimension (e.g., 1280×960). The disclosed technology may predetermine a region where faces and bodies of people tend to appear small in images captured by a wide angle camera.

The small face/body determiner 128 detects and determines faces and bodies of people in the cropped image. In aspects, the small face/body determiner 128 uses the one or more cropped regions of the image at a high resolution. For example, for the first inference, the machine learning model (i.e., the deep neural network) takes the input of a resized original image that has been captured (e.g., the originally captured image at a dimension 2560 pixels by 1440 pixels to the resized image at 352×352). For the second inference, the cropped regions contain small and/or bad lighting conditions. The second inference may use a resized image from 962×720 pixels to 352×352. As such, the new input size to the deep neural network remains the same, but scale multipliers/factors differ between the first inference and the second inference. In some other aspects, the small face/body determiner 128 may reduce possible duplicates of regions in the cropped image for an increased efficiency during the second and subsequent inferences. In aspects, there may be a plurality of iterations of inference for determining faces and bodies in the image. As an alternative aspect, when there is subsequent iteration of inference taking place, the step proceeds to the region cropper 126 for further cropping regions for performing the subsequent inferences (as shown in a dotted line from the small face/body determiner 128 to the region cropper 126 in FIG. 1).

In aspects, the machine learning models used by the large/medium face/body determiner 124 and the small face/body determiner 128 may be identical. In some other aspects, some of the machine language models used in the iterations of inferencing face/body may be at least in part distinct from one another.

The faces and bodies aggregator 130 aggregates the faces and bodies that have been detected and determined by the large/medium face/body determiner 124 and the small face/body determiner 128. In aspects, the faces and bodies may be detected based one or more iterations of inference.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
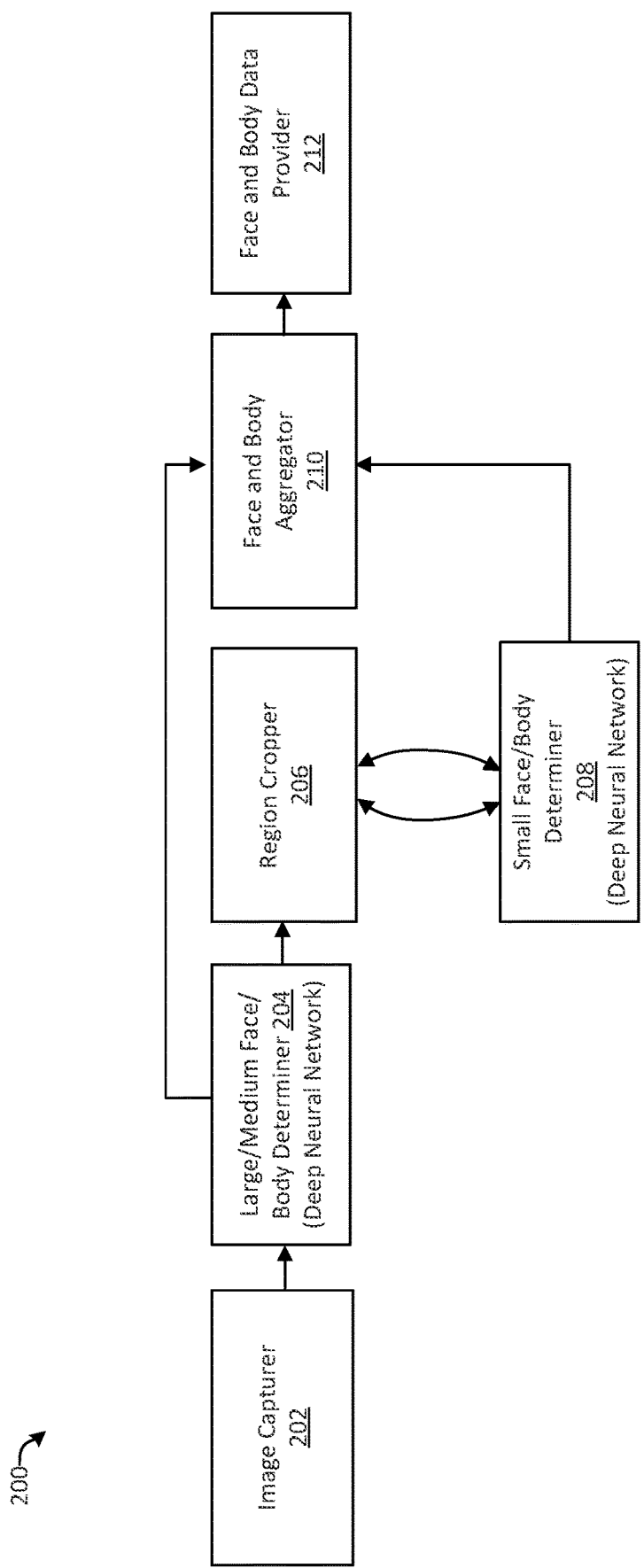
FIG. 2 illustrates an example system of determining one or more region including a face or body in accordance with aspects of the present disclosure.

FIG. 2 illustrates an example system for determining faces and bodies of people in an image in accordance with aspects of the present disclosure. FIG. 2 includes a system 200 that captures an image, adaptively selects, and iteratively scales one or more crop regions of the image. The system 200 further iteratively detect face and bodies of people in the scaled crop regions, and determines faces and bodies of people appearing in the image by aggregating faces and bodies as detected in the image and the cropped regions.

An image capturer 202 captures an image. In aspects, the image capturer 202 may include a wide angle camera for capturing an image of with a wide field of view. For example, the image may include a scene of a meeting room with a conference table in the middle, where people sit or stand at various places including the near end and the far end of the conference table.

A large/medium face/body determiner 204 detects and determines one or more faces and bodies of people in the captured image. In aspects, the large/medium face/body determiner 204 may use an artificial intelligence to infer the faces and bodies in the image. The artificial intelligence may include a machine learning model (e.g., a deep neural network). In some aspects, the machine learning model may use an image with a predetermined dimension as input and determines one or more regions where faces and bodies appear.

A region cropper 206 determines a region of interests for cropping the image for detecting smaller faces and bodies at a higher level of accuracy than the large/medium face/body determiner 204. In aspects, the region cropper 206 may exclude one or more regions where the large/medium face/body determiner 204 has detected and determined the one or more faces and bodies appear at a level of confidence that is equal to or higher than a predetermined threshold. As such, the region cropper 206 uses regions in the image where the face and/or body may appear but the level of confidence for detecting them by the large/medium face/body determiner 204 is lower than the predetermined threshold.

Accordingly, the region cropper 206 determines the region of interest where there is a likelihood of faces/or body appearing but small to detect. When the region cropper 206 determines the region of interests, the region cropper 206 generates a part of the image (i.e., a crop region) by cropping the region from the captured image. The region cropper 206 may then resize the cropped region to predetermined pixel dimensions as input to a deep learning model. For example, the region cropper 206 may crop a region with a dimension of 962×720 pixels from an originally captured dimension of 2560×1440 pixels. The region cropper 206 may then resizes the cropped region (i.e., the crop region) to 352×352 pixels.

A small face/body determiner 208 detects and determines a face and/or body appearing in the region of interests by using a machine learning model (e.g., a deep neural network). In aspects, the deep neural network takes an image with a dimension that is the same as the first inference: 352×352. The input to the deep neural network remains the same at 352×352 pixels. In contrast, a rate of reduction (e.g., scale multipliers/factors) of pixel dimensions differs between the imaged used during the first inference and the scaled crop region used during the second inference. For example, the first inference used the image that is resized from 2560×1440 pixels; the second inference used the scaled crop region that is resized from 962×720 pixels. The second inference uses image data with lower rate of reduction of resolution (i.e., from 962×720 to 352×352) from the captured image than the first inference (from 2560×1440 to 352×352). Accordingly, there may be an increased probability of accurately detecting a face and body using the scaled crop region. In aspects, the large/medium face/body determiner 124 and the small face/body determiner 128 may use the same machine learning model to detect faces and bodies during iterations of adaptive multi-scaling of the image and detecting faces and bodies. As an alternative aspect, when there is subsequent iteration of inference taking place, the step proceeds to the region cropper 206 for further cropping regions for performing the subsequent inferences (as shown in a directed arrow from the small face/body determiner 208 to the region cropper 206 in FIG. 2). In some other aspects, the small face/body determiner 208 may use a deep neural network that is more resource intensive during the second inferencing than the first inferencing by the large/medium face/body determiner 204.

In aspects, the large/medium face/body determiner 204 and the small face/body determiner 208 may be based on an identical or sharing at least a part of code and/or the deep neural network. Use of the same code and/or the deep neural network may minimize use of resources in the system. In some aspects, a system-on-chip (SOC) may impose constraints of executing one model at a time. The present disclosure does not limit the large/medium face/body determiner 204 and the small face/body determiner 208 to be implemented as the same instruction code and/or the deep neural network. In some other aspects, the large/medium face/body determiner 204 and the small face/body determiner 208 may operate concurrently using models that are distinct.

A face/body aggregator 210 aggregates faces and bodies that have been detected in the image. In aspects, the face/body aggregator 210 aggregates counts of faces and bodies that have been detected either by the large/medium face/body determiner 204 and the small face/body determiner 208 and inserts locations and sizes of regions where the respective faces and bodies appear in the image. In aspects, the face/body aggregator 210 aggregates detected rectangles that correspond to faces and bodies based on non-maximum suppression (NMS) and/or non-maximum weighted (NMW). In aspects, the face/body aggregator 210 may filter out the detection rectangles from the first inference that is fully (i.e., 100%) covered by the crop regions, and then combine all the detected rectangles and execute NMS to reduce possible duplicate results.

A face/body data provider 212 provides information associated with the determined faces and bodies in the image as output. In aspects, the system 200 may use the output to update one or more of a position, a level of zoom, and a focus of the camera (e.g., the camera 102 as shown in FIG. 1) for the camera 102 to follow a particular person or an object that moves in the image. For example, the camera 102 may zoom into the particular person when the particular person sits at a far end of the conference table in the image. In some other example, the camera 102 may zoom and follow a speaker of the meeting.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

Figure 3B:
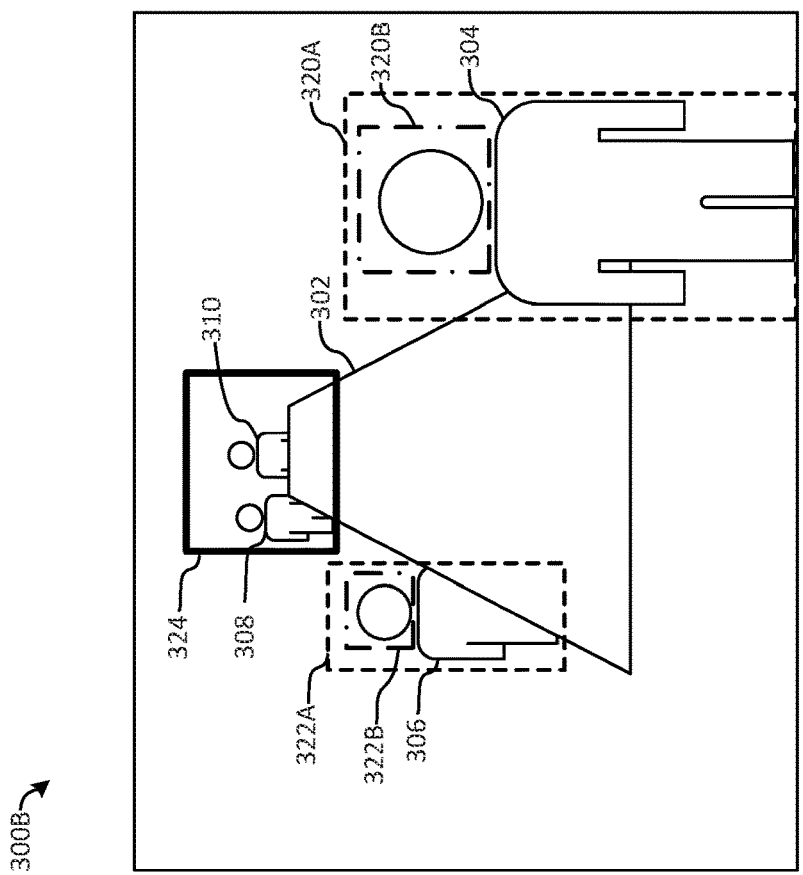
FIGS. 3A, 3B, 3C and 3D illustrate exemplary images with regions including faces and bodies in accordance with aspects of the present disclosure.
Figure 3A:
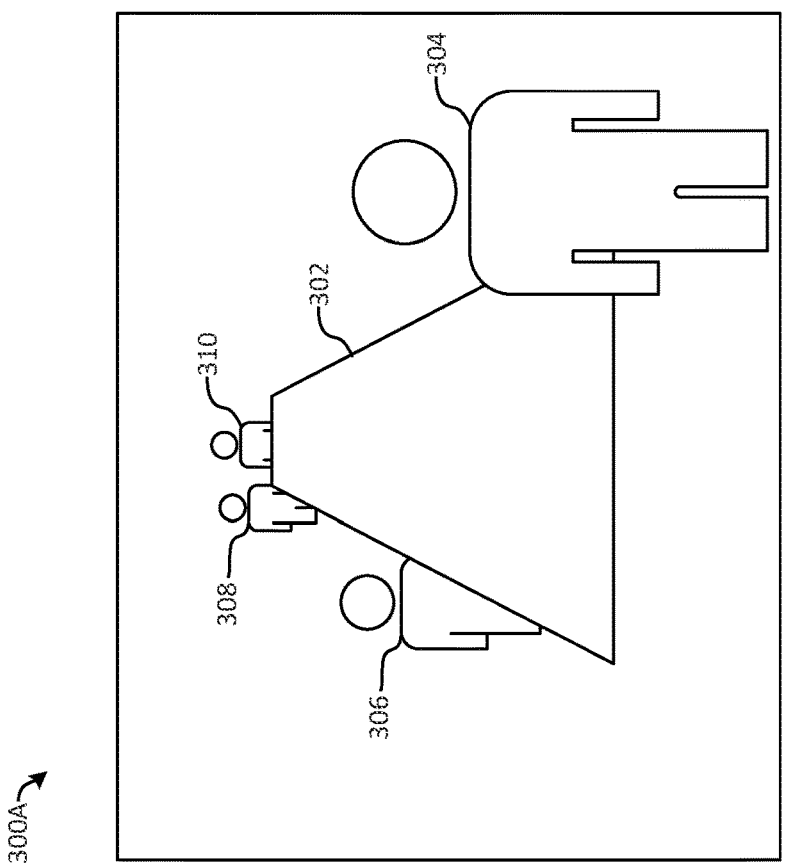

FIGS. 3A-D illustrate examples of determining faces and bodies in an image in accordance with aspects of the present disclosure. Images 300A-D represent a scene of a meeting room. FIG. 3A illustrates an example of an image of a meeting room, as captured by a camera, in accordance with aspects of the present disclosure.

In aspects, FIG. 3A represent an image captured by a wide-angle camera. In FIG. 3A, the image 300A includes a table 302 and a person A 304, a person B 306, a person C 308, and a person D 310. In aspects, the person A 304 is the closest to the camera among the four people in the image 300A. As such, the person A 304 appears the largest among the four people around the table. The person B 306 is the second closest to the camera, thus appearing slightly smaller than the person A 304. The person C 308 appears as standing near the far end of the table 302, next to the person D 310 at the far end of the table 302. The person C 308 and the person D 310 appear smaller than the person A 304 and the person B 306 because the person C 308 and the person D 310 are far away from the camera than the person A 304 and the person B 306. In aspects, the image 300A has a pixel dimension of 2560×1440 pixels, as captured by the camera. In aspects, people appearing far from the camera in a scene of a wide-angle camera may be limited to one or two regions within the image, primarily because of the large field of view in the image captured by the wide-angle camera.

FIG. 3B illustrates an example of an image depicting a scene of the meeting room as shown in FIG. 3A with marked rectangles and a region as detected in accordance with aspects of the present disclosure. FIG. 3B includes an image 300B with marked rectangles that indicate regions including faces and bodies as the large/medium face/body determiner (e.g., the large/medium face/body determiner 124 as shown in FIG. 1) has detected and determined. The image 300B further includes a marked rectangle of a region for cropping. In aspects, the image 300B is a scaled image of the image 300A with a pixel dimension of 352×352 pixels. The image 300B has been resized from the pixel dimension of the captured image (e.g., the image 300A as shown in FIG. 3A) at 2560×1440 pixels.

A region for cropping is where there is a likelihood of including small faces and bodies but the large/medium face/body determiner has not detected faces and bodies at least at an acceptable level of accuracy. In particular, a rectangle 320A represents a body of the person A 304 as detected and determined by the large/medium face/body determiner. A rectangle 320B represents a face of the person A 304 as detected and determined by the large/medium face/body determiner. A rectangle 322A represents a body of the person B 306 as detected and determined by the large/medium face/body determiner. A rectangle 322B represents a face of the person B 306 as detected and determined by the large/medium face/body determiner.

A rectangle 324 represents a region for cropping. The region is where a level of confidence of detecting faces and bodies is lower than a predetermined threshold. The faces and bodies appearing in the rectangle 324 are too small for the large/medium face/body determiner to detect and determine the face and the body with a level of accuracy needed. In aspects, the rectangle 324 includes faces and bodies of the person C 308 and the person D 310. In some aspects, the rectangle 324 does not overlap with the rectangle 320A and the rectangle 322A. In some other aspects, the rectangle 324 may overlap with a region where the large/medium face/body determiner has determined that there is a face and a body of a person. In particular, the rectangle 324 may overlap the region when there is a person closer to the camera partially hiding another person at a far distance. For example, a pixel dimension of the marked rectangle 324 in the captured image is 962×720 pixels.

Figures 3C, 3D:
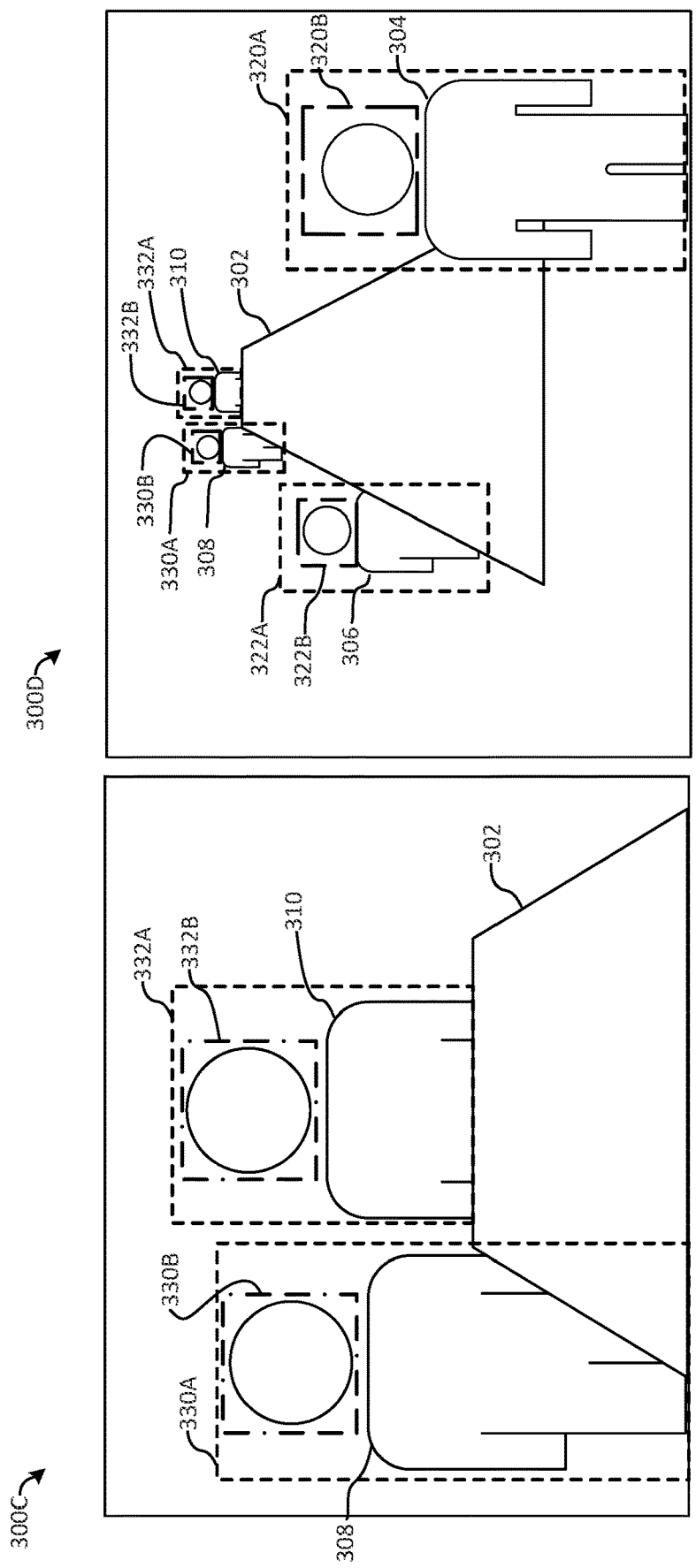

FIG. 3C illustrates an example of an image of the scaled cropped region (i.e., crop region) in in accordance with aspects of the present disclosure. The scaled cropped region, which has been generated by first cropping a region from the captured image, may then be resized. For example, the image 300C has a pixel dimension of 352×352 pixels, which has been resized from a pixel dimension (962×720 pixels) of the crop region in the captured image having 2560×1440 pixels.

In aspects, the image 300C includes the two people at the far end of the table 302 of the meeting room. A rectangle 330A represents a region that includes a body of the person C 308 as detected by the small face/body determiner (e.g., the small face/body determiner 128 as shown in FIG. 1) based on the image 300C. A rectangle 330B represents a region that includes a face of the person C 308 as detected by the small face/body determiner based on the image 300C. A rectangle 332A represents a region that includes a body of the person D 310 as detected by the small face/body determiner based on the image 300C. A rectangle 332B represents a region that includes a face of the person D 310 as detected by the small face/body determiner based on the image 300C.

In aspects, the small face/body determiner and the large/medium face/body determiner have the same level of performance in detect faces and bodies. Both the image 300B and the image 300C have the same pixel dimension of 532×532 pixels. Nevertheless, the small face/body determiner may determine the faces and the bodies with a level of accuracy that is acceptable with the image 300C whereas the large/medium face/body determiner would not have detected based on the image 300B. The difference in performance arises from a difference in resolutions of the respective images. The image 300B was resized from the captured image with 2560×1440 pixels, whereas the image 300C was resized from the cropped image with 962×720 pixels. The image 300C retains a better image quality because of less reduction rate for resizing. As such, the small face/body determiner may detect and determine faces and bodies that are small in sizes.

FIG. 3D illustrates an example of an aggregated result of detecting and determining faces and bodies of people in accordance with aspects of the present disclosure. The image 300D includes the person A 304, the person B 306, the person C 308, the person D 310 around the table 302. In aspects, the image 300D includes marked regions. The respective regions represent faces and bodies of people as detected and determined by either the large/medium face/body determiner or the small face/body determiner.

In aspects, the rectangle 320A represents a region including a body of the person A 304. The rectangle 320B represents a region including a face of the person A 304. The rectangle 322A represents a region including a body of the person B 306. The rectangle 322B represents a region including a face of the person B 306. The rectangle 330A represents a region including a body of the person C 308. The rectangle 330B represents a region including a face of the person C 308. The rectangle 332A represents a region including a body of the person D 310. The rectangle 332B represents a region including a face of the person D 310.

Accordingly, the present disclosure detects various sizes of faces and bodies of people in a captured image at an acceptable level of accuracy and performance by adaptively scaling one or more regions in the image and detecting faces and bodies of various sizes in scaled images. In aspects, a model used for iterative inferencing of faces and bodies may use input image at a constant pixel dimension (e.g., 352×352 pixels). The cropped and resized images have better resolutions than the image used for the first inference (e.g., the image 300B) because a rate of reduction of the image is lower for the cropped images.

In aspects, a rate of reduction (e.g., a scale multiplier and/or factor) differs between the image (e.g., the image 300B) used for the first inference and the image (e.g., the image 300C) used for the second inference. There may be an increased probability of detecting faces and bodies from the crop region while maintaining the same level of speed to detect the faces and bodies because a pixel dimension of the input is the same between the two inferences. In some other aspects, there may be more than two iterations of cropping regions, resizing the crop regions, and detecting faces and bodies in the resized crop regions.

In aspects, the image 300D represents an aggregated set of regions including faces and bodies. The disclosed technology may determine, based on the aggregated result, one or more faces (and/or bodies) to maintain a focus and modify settings of the camera. For example, the disclosed technology may determine one or more regions in the image to focus on and zoom into these regions by updating a level of zoom of the camera. In some other aspects, the present disclosure may track locations of the one or more regions in the image and maintain the centering of the one or more regions by changing a direction of the camera. For example, the camera may zoom into and/or zoom out on a face of a person and follow the person as the location of the face in the image moves as the camera continues to capture images.

Figure 4:
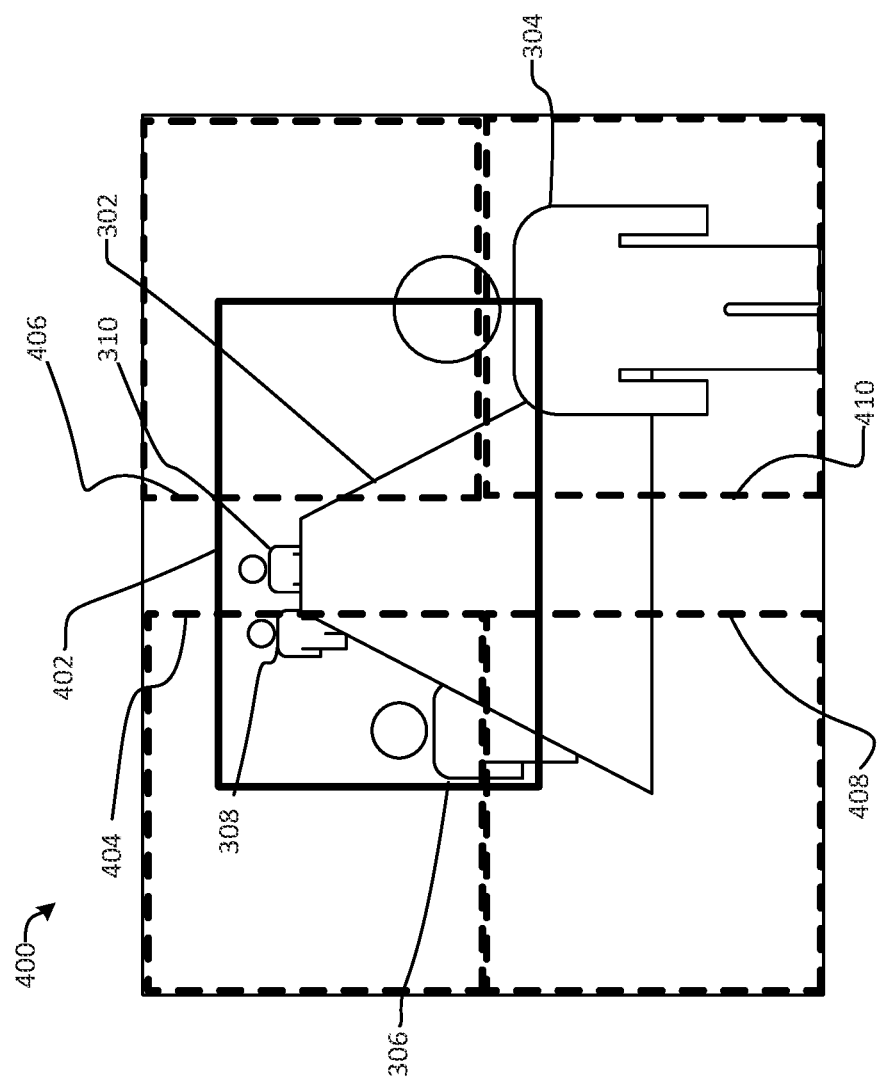
FIG. 4 illustrates an exemplary image with regions including faces and bodies in accordance with aspects of the present disclosure.

FIG. 4 illustrates an example image for detecting faces and bodies in accordance with aspects of the present disclosure. Similar to an image 300B as shown in FIG. 3B, an image 400 includes the person A 304, the person B 306, the person C 308, and the person D 310 around the table 302. In aspects, the image 400 includes four pre-determined regions in a grid (e.g., grid regions) as candidate regions for cropping: a predetermined region A 402, a predetermined region B 404, a predetermined region C 406, and a predetermined region 408. A number of the predetermined regions is not limited to five. In aspects, people appearing far from the camera in a scene of a wide-angle camera may be limited to one or two predetermined regions within the image, primarily because of the large field of view in the image captured by the wide-angle camera.

In aspects, the region cropper (e.g., the region cropper 126 as shown in FIG. 1) may perform a grid search and rank the predetermined regions based on levels of confidence for detecting faces and/or bodies in respective regions. For example, among the four predetermined regions, the region cropper may determine that the predetermined region 402 has the lowest level of confidence in detecting faces and/or bodies because the possible people may be too small in the predetermined region 402 for detection. In some aspects, the region cropper may select more than one predetermined boxes for a plurality of iterations of detecting and determining faces and/or bodies. In some aspects, when the region cropper does not find a predefined region with low-confidence detection, the region cropper may use the predetermined region 402, which is at the center of image 400. In aspects, an image as captured by a wide angle camera may include faces and bodies in small sizes toward the center of the image than toward the outer edges of the image.

Figure 5:
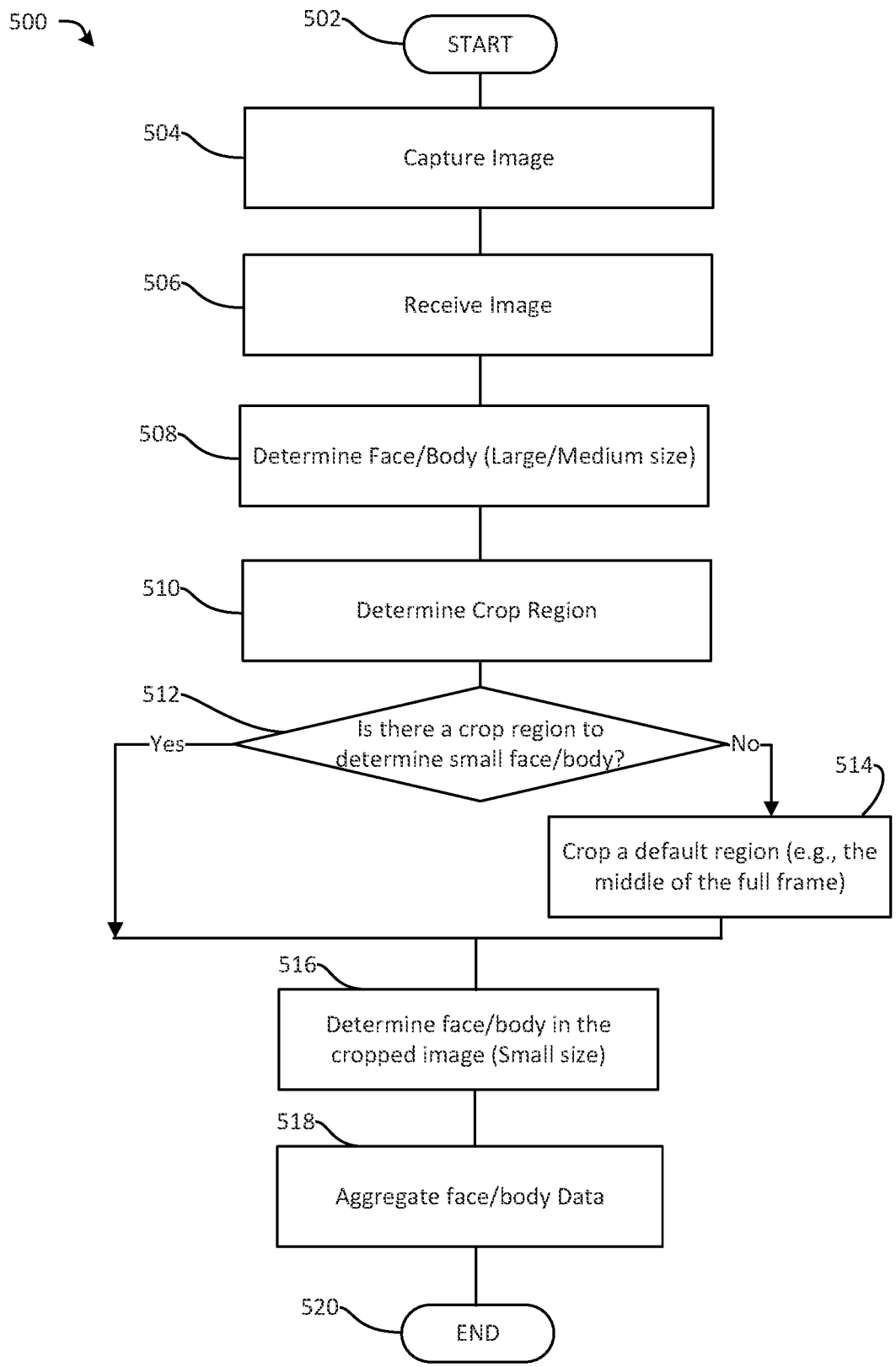
FIG. 5 illustrates an example of a method for determining one or more faces and body in an image in accordance with aspects of the present disclosure.

FIG. 5 illustrates an example of a method for determining faces and bodies in an image in accordance with aspects of the present disclosure. A general order of the operations for the method 500 is shown in FIG. 5. Generally, the method 500 begins with start operation 502 and ends with end operation 520. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2A-B, 3, 4, 6, 7, and 8A-B.

Following start operation 502, the method 500 begins with a capture operation 504, which captures an image using a camera. In aspects, the camera may be a wide angle camera. The image may include faces and bodies of people in varying sizes. For example, the image may represent a scene of a meeting room with meeting participants at a table at the near end that is the closest to the camera and at the far end that is a far from the camera. In aspects, the image may be a frame of a video.

A receive operation 506 receives the captured image for detecting and determining faces and bodies of people in the image. For example, the image may be a high solution image with a pixel dimension of 2560×1440 or more, depicting details of faces and bodies that are small in size.

A face/body determine operation 508 determines faces and bodies of people in the captured image. In aspects, the face/body determine operation 508 may use a deep neural network for detecting faces and bodies of people in the image. The deep neural network may receive an image with a predetermined pixel dimension (e.g., 352×352 pixels) that is smaller than the pixel dimension of the received image (2560×1440 pixels). Accordingly, the face/body determine operation 508 may resize the received image to the predetermined pixel dimension. In aspects, the face/body determine operation 508 detects and determines faces and bodies in large and/or medium sizes at an acceptable level of accuracy (e.g., a high level of confidence) while detecting other faces and bodies at lower levels of confidence. For example, the deep neural network may use the cropped region with 352×352 pixels as an input image, detect faces/bodies in the input image, and determine one or more rectangles that include the detected faces/bodies. In some aspects, the levels of confidence may be based on a degree of likelihood that a region includes faces and/or bodies as output from the deep neural network.

A crop region determine operation 510 determines one or more regions for cropping. In aspects, the crop region determine operation 510 may determines a region where the face/body determine operation 508 detected faces/bodies at a low level of confidence. In some other aspects, the crop region determine operation 510 may perform a grid search to count a number of low-confidence detection boxes in predetermined regions in a grid in the image. The crop region determine operation 510 may rank the respective predetermined regions based on confidence level and select one or more predetermined regions from the lowest level of confidence.

In aspects, the crop region determine operation 510 may generate an image that represents a cropped region by resizing the region of the received image (e.g., from 970× 720 pixels to 352×352 pixels).

A decision 512 determines whether there is a region for cropping to detect and determine faces and bodies of people. When there is a region for cropping (Yes), a face/body determine operation 516 detects and determines faces/bodies in the cropped image. When there is no region for cropping (No), a crop operation 514 crops a default region from the image. In aspects, the default region corresponds to the middle region (e.g., the center) of a full frame of the image. Vertical and horizontal dimensions of the default region may be predetermined.

In aspects, the face/body determine operation 516 uses a deep neural network to infer faces and bodies in the cropped image. For example, the deep neural network may use the cropped region with 352×352 pixels as an input image, detect faces/bodies in the input image, and determine one or more rectangles that include the detected faces/bodies. In aspects, the face/body determine operation 516 detects faces and bodies that are too small for the face/body determine operation 508 to detect in the received image. In some aspects, the face/body determine operation 508 and the face/body determine operation 516 may use an artificial intelligence models (e.g., the deep neural networks) that are identical. In aspects, there may be more than two iterations of cropping regions and determining faces/bodies in the cropped regions for accurately determining faces/bodies that appear small in the captured image.

An aggregate operation 518 aggregates the rectangles as determined by the face/body determine operation 508 and the face/body determine operation 516. In aspects, the aggregate operation 518 may superimpose rectangles that represent regions that include bodies and faces of people. Following the aggregate operation 518, the method 500 ends with end operation 518.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
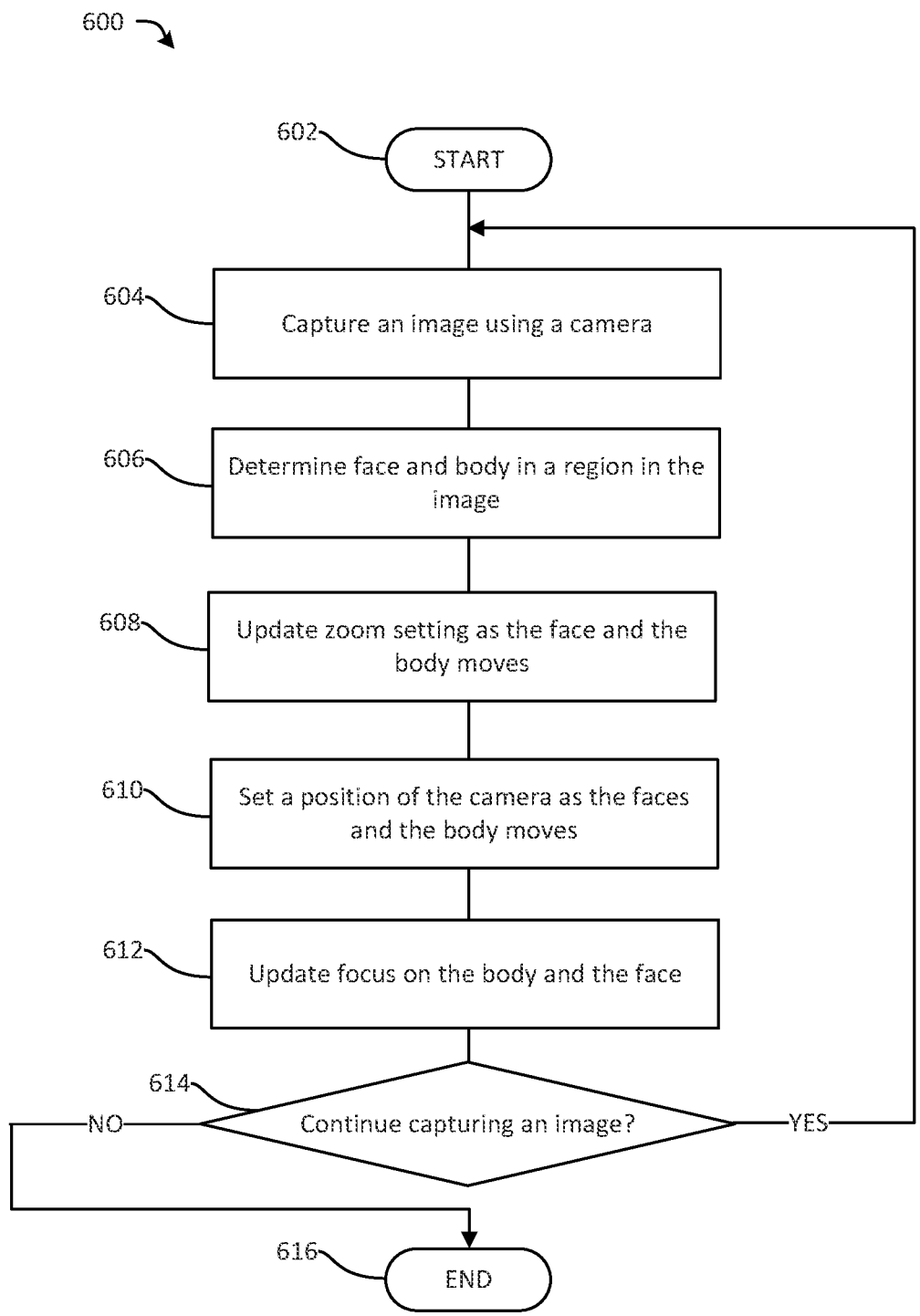
FIG. 6 illustrates an example of a method for updating settings of a camera based on images based on determined faces and bodies in captured images in accordance with aspects of the present disclosure.

FIG. 6 illustrates an example of a method for updating settings of a camera based on images based on determined faces and bodies in captured images in accordance with aspects of the present disclosure. A general order of the operations for the method 600 is shown in FIG. 6. Generally, the method 600 begins with start operation 602 and ends with end operation 616. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A-B, 4, 5, 7, and 8A-B.

Following start operation 602, the method 600 begins with capture operation 604, which captures an image using a camera. In aspects, the camera may be automatically configurable in its zoom setting, a position (e.g., a direction of the camera), and a focus. In some aspects, the camera may be a video camera that captures the image as a frame of a video.

A face/body determine operation 606 determines faces and bodies in one or more regions in the image. In some aspects, the face/body determine operation 606 may include a plurality of iterations of cropping, resizing, and detecting faces and bodies in the image. The face/body determine operation 606 generates an aggregated set of rectangles that respectively include a face or a body of a person based on the adaptive scaling of images for detecting faces and bodies as detailed above (e.g., the aggregate operation 518 as shown in FIG. 5). In aspects, the face/body determine operation 606 may select one or more of the rectangles as focal points for adjusting the camera setting. In aspects, the one or more regions in the image represent objects of interest. The face/body determine operation 606 may determine a rectangle in the aggregated set of rectangles as a region of interest. In aspects, the disclosed technology may use the region of interest and/or an object of interest to zoom into the region and/or automatically follow the region in the camera frame.

An update zoom operation 608 updates zoom setting of the camera based on locations of the selected rectangles in the captured image. In aspects, the update zoom operation 608 updates the zoom setting for the camera to capture a close-up that includes the selected rectangles.

A set position operation 610 sets a position (i.e., a direction) of the camera. In aspects, the set position operation 610 sets the position such that the camera aims at the selected rectangles toward the center of the image. The position of the camera may be updated by changing one or more parameters associated with degrees of freedom. For example, under six degrees of freedom, the parameters may include at least in part: moving up and down (elevating/ heaving), moving left and right (strafing/swaying), moving forwards and backward (walking/surging), swivels left and right (yawing), tilts forward and backward (pitching), and pivots side to side (rolling).

An update focus operation 612 updates a focus setting of the camera to focus on the selected rectangles in the image. In some aspects, the camera may be cable of focusing on multiple objects in the image. In some other aspects, the camera may focus on a single object in the image.

A decision 614 decides whether to capture an image. For example, when the camera is a video camera, the video camera may continue capturing the image as the next frame of a video based on the updated settings of the camera. When the camera continues capturing an image, the method continues to the capture operation 604.

When the camera does not continue capturing an image, the method 600 ends with the end operation 616. As such, the method 600 effectively enables a camera to follow one or more people in a scene as they move in the scene.

As should be appreciated, operations 602-616 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
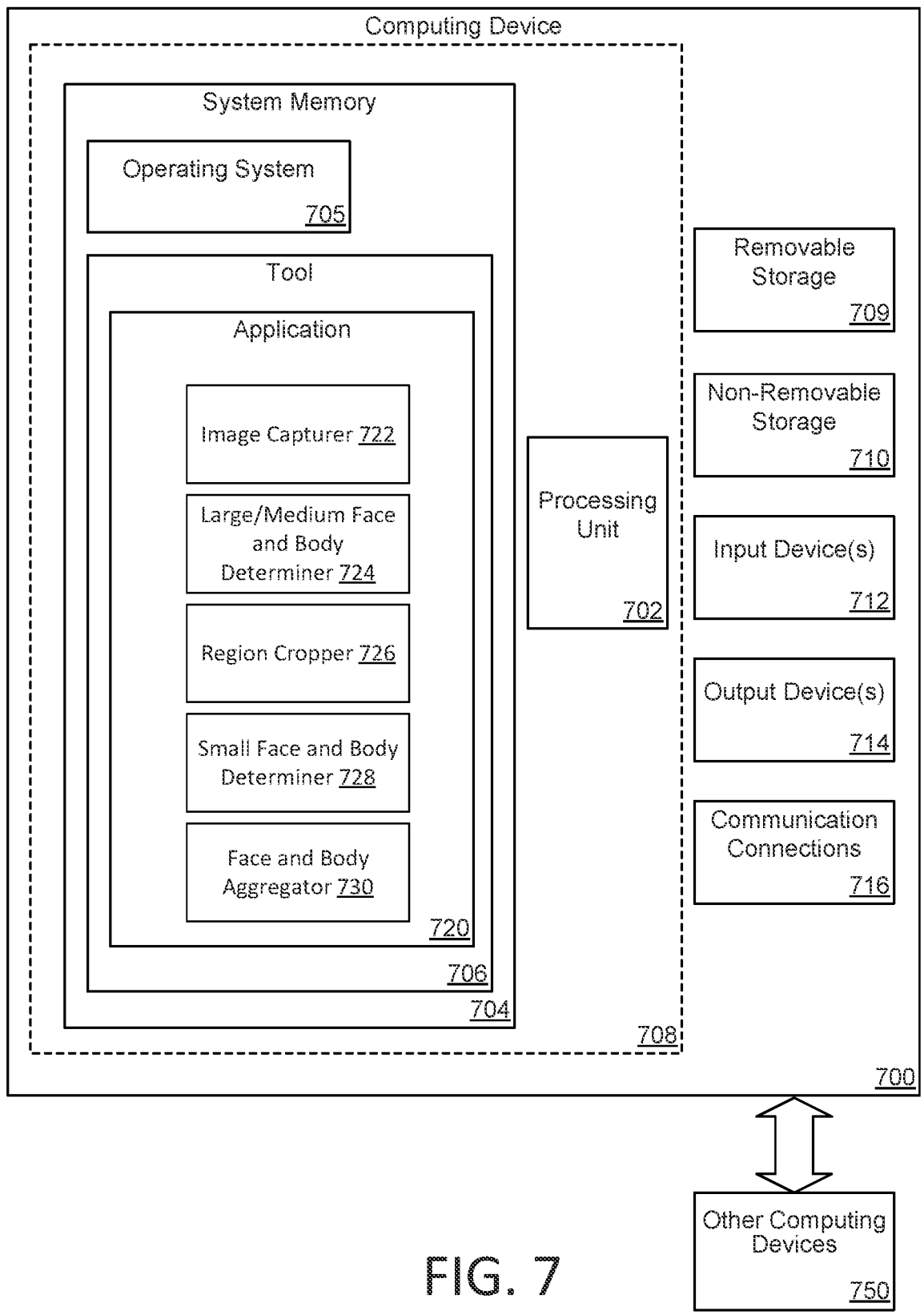
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an image capturer 722, a large/medium face/body determiner 724, a region cropper 726, a small face/body determiner 728, and a face/body aggregator 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
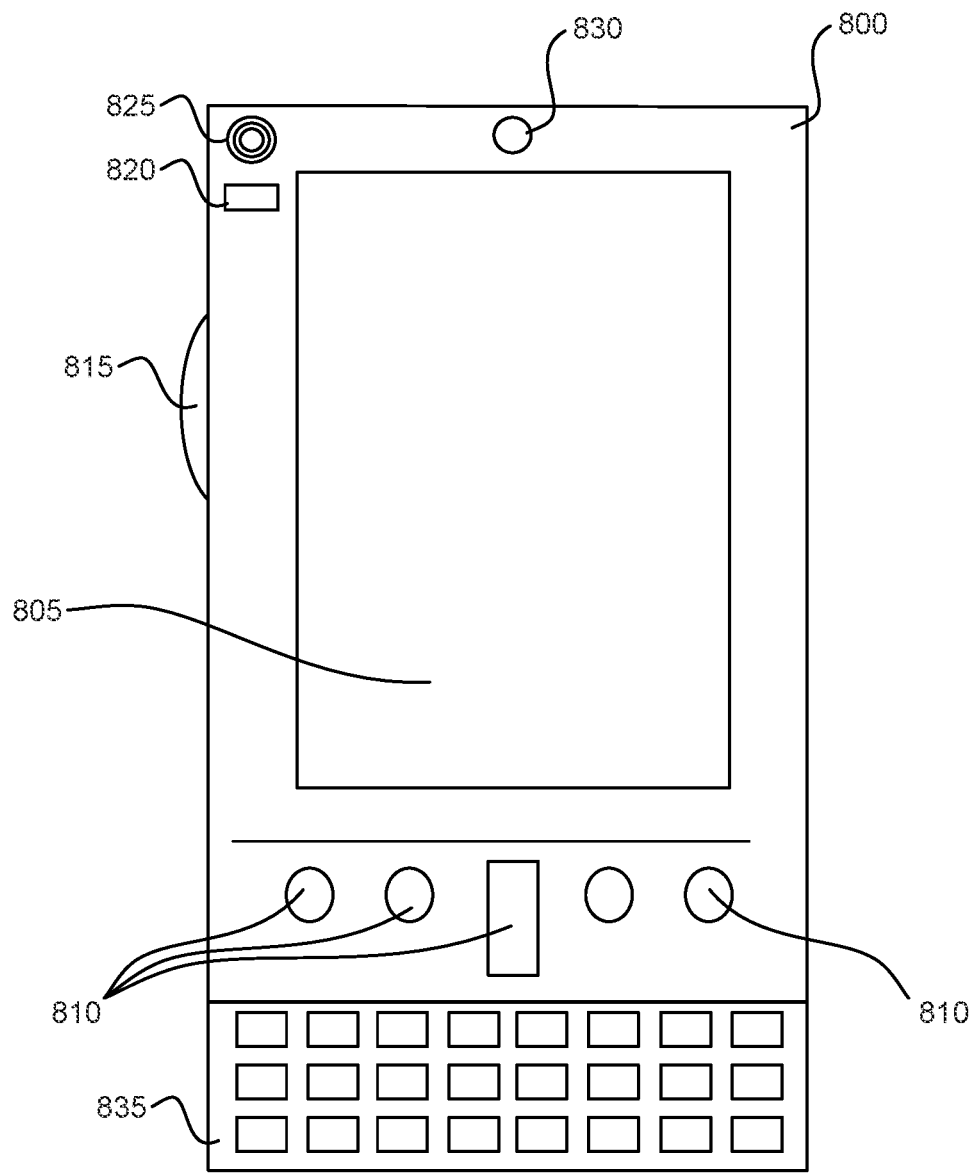
FIG. 8A is a simplified diagram of a mobile computing device with which aspects of the present disclosure may be practiced.
Figure 8B:
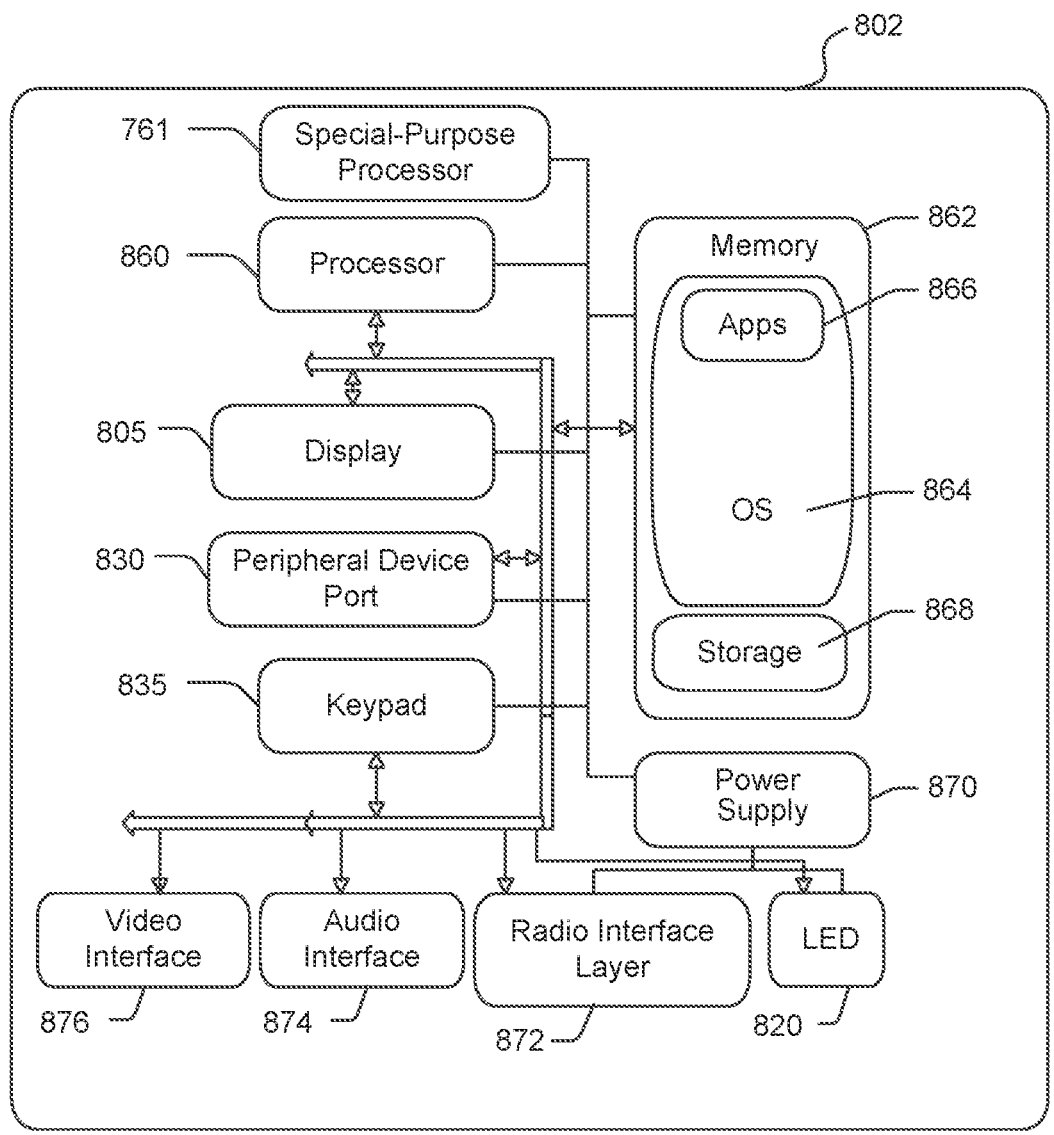
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., an operator of the camera 102, the client device 104, and the meeting server 106 as shown in the system 100 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the camera 102 and the meeting server 106 as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera connected to a peripheral device port 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for updating setting of a camera according to at least the examples provided in the sections below. The method comprises obtaining an image; resizing the image to a first predetermined size, wherein the first predetermined size is associated with a size of input to a first machine learning model for detecting an object; determining a first object in the image using the first machine learning model; determining, based on a level of confidence associated with detecting a second object in the image using the first machine learning model, a region within the image, the region includes the second object; resizing the region to a second predetermined size, wherein the second predetermined size is associated with a size of input to a second machine learning model for detecting the object; determining, based on the level of confidence associated with detecting the second object in the region using the second machine learning model, the second object in the region, wherein the first object and the second object are distinct; aggregating respective locations and sizes of the first object and the second object in the image; determining the second object in the aggregated image as an object of interest; and updating, based on the second object, at least one of a position or a zoom setting of a camera. The first object includes either a face or a body of a person. The first and machine language model and the second machine learning model are identical, and wherein the first predetermined size and the second predetermined size are identical. The first and machine language models include a deep neural network. A location of the region is one of predetermined set of grid regions in the image. A size of the image is greater than a size of the region, wherein the size of the region is greater than both of the first predetermined size and the second predetermined size, and wherein the size of the image represents a set of number of pixels in horizontal and vertical directions as a pixel dimension of the image. The aggregating includes non-maximum suppression.

Another aspect of the technology relates to a system for determining objects in an image. The system comprises a processor; and a memory storing computer-executable instructions that when executed by the processor cause the system to: resizing the image to a first predetermined size, wherein the first predetermined size is associated with a size of input to a first machine learning model for detecting an object; determining a first object in the image using the first machine learning model; determining, based on a level of confidence associated with detecting a second object in the image using the first machine learning model, a region within the image, the region includes the second object; resizing the region to a second predetermined size, wherein the second predetermined size is associated with a size of input to a second machine learning model for detecting the object; determining, based on the level of confidence associated with detecting the second object in the region using the second machine learning model, the second object in the region, wherein the first object and the second object are distinct; aggregating respective locations and sizes of the first object and the second object in the image; updating, based on the aggregated respective locations and sizes of the first object and the second object, a setting of a camera, wherein the setting includes at least one of a position or a zoom level of the camera; and capturing, based on the updated setting of the camera, another image. The object includes either a face or a body of a person. The first and machine language models include a deep neural network. A location of the region is one of predetermined set of grid regions in the image. The first machine learning model and the second machine learning model are identical, and wherein the first predetermined size and the second predetermined size are identical. A size of the image is greater than a size of the region, wherein the size of the region is greater than both of the first predetermined size and the second predetermined size, and wherein the size of the image represents a set of number of pixels in horizontal and vertical directions as a pixel dimension of the image. The aggregating includes non-maximum suppression.

In still further aspects, the technology relates to a computer-implemented method. The computer-implemented method comprises capturing an image using a camera; resizing the image to a first predetermined size, wherein the first predetermined size is associated with a size of input to a first machine learning model for detecting a face of a person; determining a first face in the image using the first machine learning model; determining, based on a level of confidence associated with detecting a second face in the image using the first machine learning model, a region within the image, the region includes the second face; resizing the region to a second predetermined size, wherein the second predetermined size is associated with a size of input to a second machine learning model for detecting the face; determining, based on the level of confidence associated with detecting the second face in the region using the second machine learning model, the second face in the region, wherein the first face and the second face are distinct; aggregating respective locations and sizes of the first face and the second face in the image; updating, based on the aggregated respective locations and sizes of the second face, a setting of the camera; and capturing, based on the updated setting of the camera, another image. The first and machine language models include a deep neural network. A location of the region is one of predetermined set of grid regions in the image. The first machine learning model and the second machine learning model are identical, and wherein the first predetermined size and the second predetermined size are identical. A size of the image is greater than a size of the region, wherein the size of the region is greater than both of the first predetermined size and the second predetermined size, and wherein the size of the image represents a set of number of pixels in horizontal and vertical directions as a pixel dimension of the image. The setting includes at least one of a position or a zoom level of the camera.

Any of the one or more above aspects in combination with any other of the one or more aspect. Any of the one or more aspects as described herein.

What is claimed is:

1. A computer-implemented method, comprising:
   obtaining an image;
   determining a first object in the image using a first machine learning model, wherein the first machine learning model is trained to detect the first object and generate a level of confidence of detecting the first object as at least a part of a body in the image;
   determining, based on a first level of confidence of detecting a second object in the image using the first machine learning model, a region within the image, wherein the region includes the second object, and the first object and the second object are distinct and without overlapping;
   determining, based on a second level of confidence associated with detecting the second object as at least a part of another body in the region using a second machine learning model, the second object in the region; and
   automatically updating, based on the second object, a zoom setting of a camera to zoom and follow the second object.

2. The computer-implemented method according to claim 1, wherein the first object includes either a face or a body of a person.

3. The computer-implemented method according to claim 1, wherein the first and machine learning model and the second machine learning model are identical.

4. The computer-implemented method according to claim 2, wherein the first machine learning model includes a deep neural network.

5. The computer-implemented method according to claim 2, wherein a location of the region is one of predetermined set of grid regions in the image.

6. The computer-implemented method according to claim 1, wherein a size of the image is greater than a size of the region, and wherein the size of the image represents a set of number of pixels in horizontal and vertical directions as a pixel dimension of the image.

7. The computer-implemented method according to claim 6, further comprising:
   aggregating respective locations and sizes of the first object and the second object in the image, wherein the aggregating includes non-maximum suppression.

8. A system for determining objects in an image, the system comprising:

a processor; and a memory storing computer-executable instructions that when executed by the processor cause the system to:

determine a first object in the image using a first machine learning model, wherein the first machine learning model is trained to detect the first object and generate a level of confidence of detecting the first object as at least a part of a body in the image;

determine, based on a first level of confidence of detecting a second object in the image using the first machine learning model, a region within the image, wherein the region includes the second object, and the first object and the second object are distinct and without overlapping;

determine, based on a second level of confidence associated with detecting the second object as at least a part of another body in the region using a second machine learning model, the second object in the region; and automatically update, based on the second object, a setting of a camera, wherein the setting includes a zoom level of the camera to zoom and follow the second object; and capture, based on the updated setting of the camera, another image.

9. The system of claim 8, wherein the first object includes either a face or a body of a person.

10. The system of claim 9, wherein the first machine learning model includes a deep neural network.

11. The system of claim 9, wherein a location of the region is one of predetermined set of grid regions in the image.

12. The system of claim 9, wherein the first machine learning model and the second machine learning model are identical.

13. The system of claim 9, wherein a size of the image is greater than a size of the region and wherein the size of the image represents a set of number of pixels in horizontal and vertical directions as a pixel dimension of the image.

14. The system of claim 9, the computer-executable instructions when executed by the processor further cause the system to:

aggregate respective locations and sizes of the first object and the second object in the image, wherein the aggregating includes non-maximum suppression.

15. A computer-implemented method, comprising:

capturing an image using a camera;

determining a first face in the image using a first machine learning model, wherein the first machine learning model is trained to detect a face of a person in an image and generate a level of confidence of detecting the face as at least a part of a body in the image;

determining, based on a first level of confidence of detecting a second face in the image using the first machine learning model, a region within the image, wherein the region includes the second face, and the first face and the second face are distinct and without overlapping;

determining, based on a second level of confidence associated with detecting the second face as at least a part of another body in the region using a second machine learning model, the second face in the region; and automatically updating, based on the second face, a setting of the camera to zoom and follow the second face; and capturing, based on the updated setting of the camera, another image.

16. The computer-implemented method of claim 15, wherein the first machine learning model includes a deep neural network.

17. The computer-implemented method of claim 15, wherein a location of the region is one of predetermined set of grid regions in the image.

18. The computer-implemented method of claim 15, wherein the first machine learning model and the second machine learning model are identical.

19. The computer-implemented method of claim 15, wherein a size of the image is greater than a size of the region, and wherein the size of the image represents a set of number of pixels in horizontal and vertical directions as a pixel dimension of the image.

20. The computer-implemented method of claim 15, wherein the setting includes at least one of a position or a zoom level of the camera.

* * * * *